M. T. WESTON.
RESILIENT WHEEL.
APPLICATION FILED APR. 13, 1916.
1,289,586.
Patented Dec. 31, 1918.
3 SHEETS—SHEET 2.
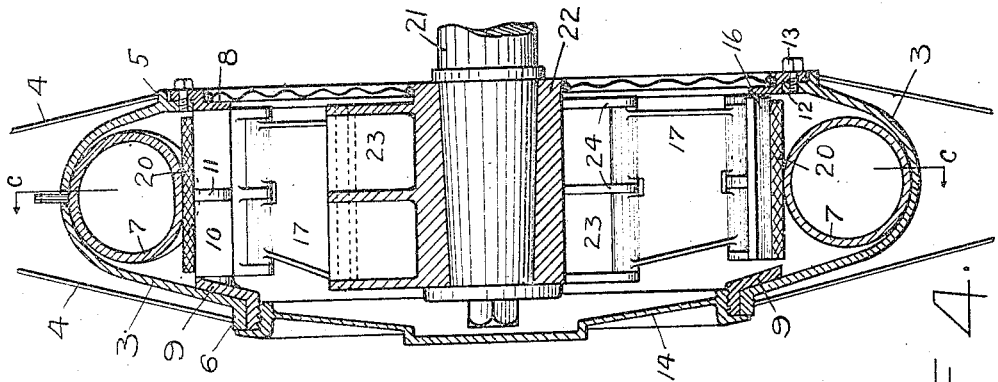
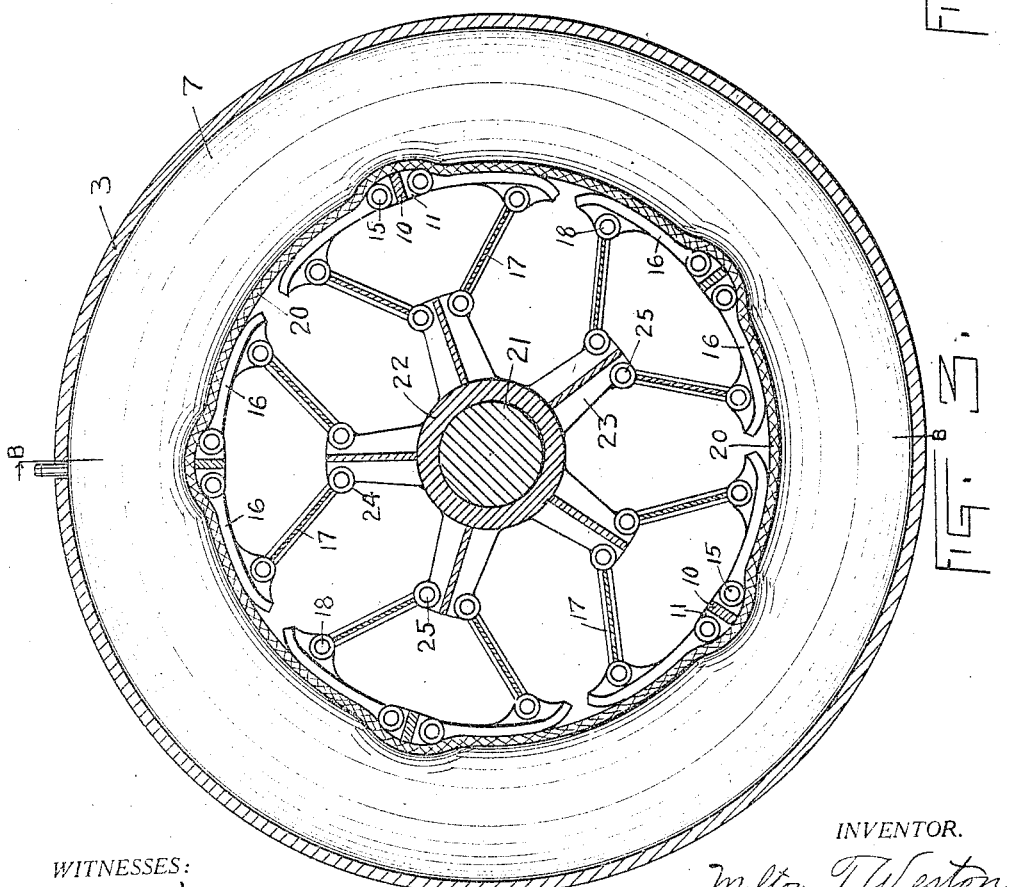
WITNESSES:
O. McKenzie
G. Cowan
INVENTOR.
Milton T. Weston

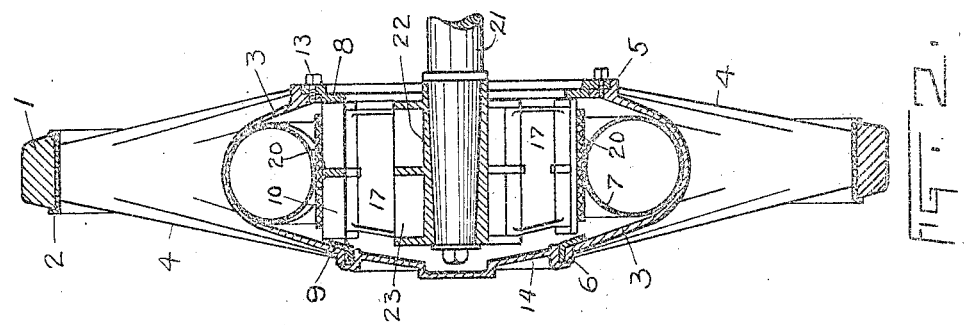
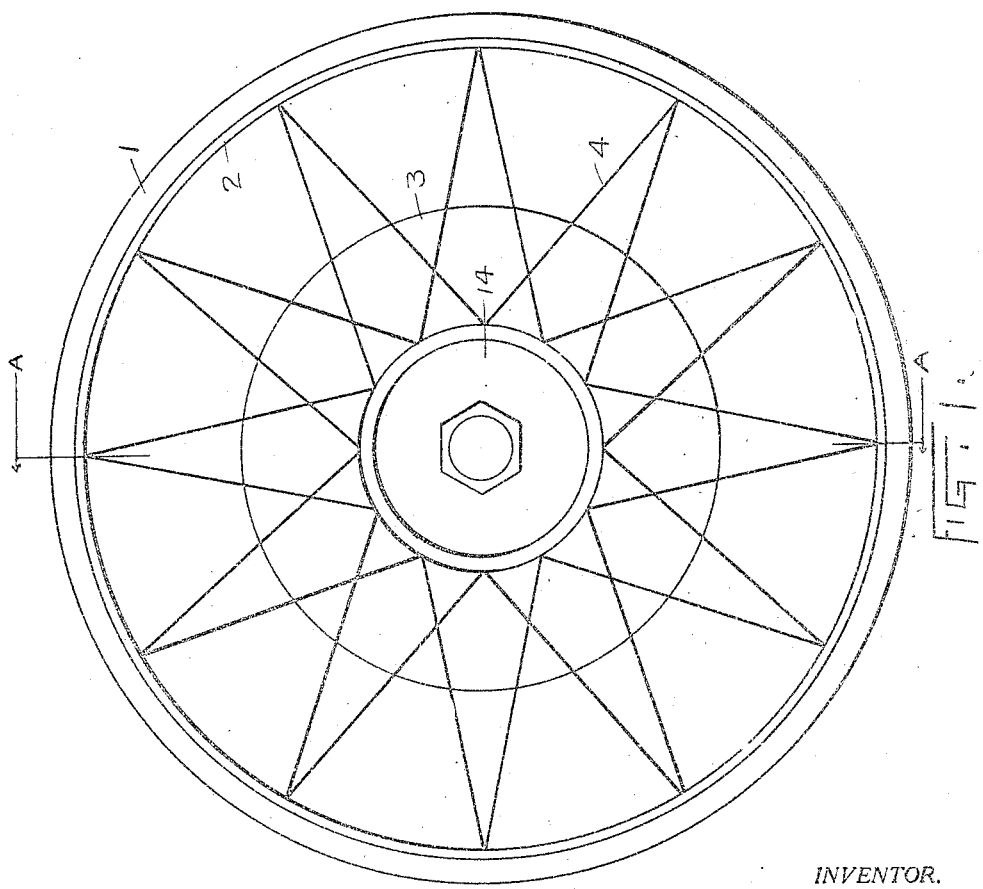

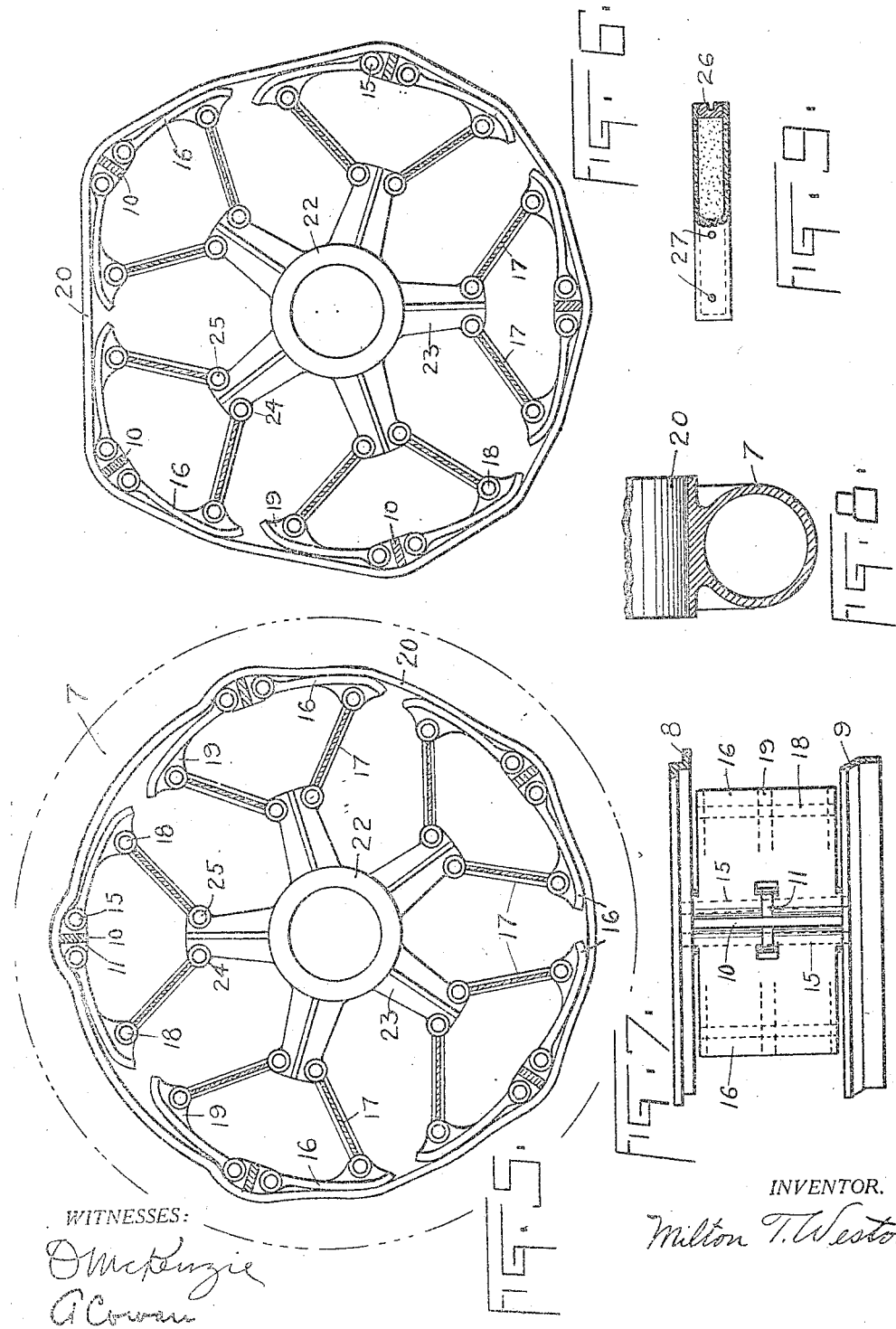

UNITED STATES PATENT OFFICE.

MILTON T. WESTON, OF NEW YORK, N. Y.

RESILIENT WHEEL.

1,289,586.   Specification of Letters Patent.   Patented Dec. 31, 1918.

Application filed April 13, 1916. Serial No. 90,909.

*To all whom it may concern:*

Be it known that I, MILTON T. WESTON, a citizen of the United States, and resident of New York, in the county of New York and State of New York, have invented certain new and useful Improvements in Resilient Wheels, of which the following is a specification.

My invention relates to improvements in resilient wheels for automobiles and other vehicles, wherein the pneumatic resilient member is located in the central part of the wheel in an enlarged inclosed hub casing, thereby being protected from the elements and from contact with the road surface.

The object of my invention is to provide a reliable and efficient substitute for the present form of pneumatic tire, wherein the pneumatic member is not only removed from contact with the road surface but wherein the said pneumatic member is also thoroughly protected from interval frictional wear by the particular construction of the weight transmitting devices. A further object is to provide means for limiting the movement of the weight transmitting devices, said limiting means also serving as a substitute for the resilient member, in case of destruction of the latter, and thus avoiding the necessity of making repairs along the road. A further important object obtained by my invention is the cushioning of the power transmitted from the driving axle to the outer wheel member by means of the construction and arrangement of the weight transmitting levers acting in conjunction with the resilient member. This desirable result relieves the engine and transmission parts of much of the strains they are at present subjected to. Other objects attained are novel means of alinement, simplicity of construction and reliability in operation.

My invention is fully described in the following specification and clearly shown in the accompanying drawings in which similar reference numbers refer to similar parts in all the views.

Figure 1, is a side view of a wheel embodying my invention.

Fig. 2, is a sectional view substantially on a line A—A of Fig. 1.

Fig. 3, is a sectional view of the enlarged hub casing showing the resilient member, the inelastic limiting band and weight transmitting devices. The section is in the plane of the wheel and on a line C—C of Fig. 4.

Fig. 4, is a transverse sectional view through the enlarged outer hub illustrated in Fig. 3 and is taken on a line B—B.

Fig. 5, is a side view similar to Fig. 3 except that only that part of the resilient member contiguous to the inelastic band, is shown. This view illustrates the action of the weight transmitting levers within their normal working range when the inner hub is depressed by the weight of the vehicle. In this view the effect of this action of the transmitting levers upon the inelastic band and upon the resilient member is also clearly shown.

Fig. 6, is a view similar to Fig. 5, and illustrates the action of the weight transmitting levers when limited in their movement by the inelastic band. This condition obtains in case of the deflation or destruction of the resilient member.

Fig. 7, is a plan view of a pair of swinging levers as for example the pair shown at the top of Fig. 5.

Fig. 8, illustrates a modification in the construction of the inelastic band and resilient member wherein they are shown attached to or integral with each other.

Fig. 9, is a detailed view of one of the pins showing the method of internal lubrication.

In carrying out my invention I prefer to use the wire wheel type of construction in which the tire 1 is mounted on a rim 2 connected to the enlarged hub 3 by means of two series of wire spokes 4 anchored in flanges 5 and 6, at the inner and outer ends respectively of said hub. The enlarged hub 3 swells radially outward between the two series of wire spokes and thus provides the necessary internal space for the resilient member 7. In the several views I have shown the pneumatic type of resilient member as being the most desirable. It may be necessary, however, to use a solid rubber or other type of resilient member for heavy vehicles.

Mounted in the hub 3 is a spider composed of a ring 8 on the inner side, a ring 9 on the outer side and a plurality of equally spaced connecting bars 10 joining the two rings 8 and 9 together. On opposite sides of each of the connecting bars 10 are the pin-supporting lugs 11 to be referred to hereinafter.

The ring 8 on the inner end of this hub spider is shown flanged radially so as to engage an annular flange 12 at the inner open end of the enlarged hub 3. This flanged inner opening in the hub is preferably larger than the diameter of the spider measured over the connecting bars 10 in order that said spider may be readily put into position in the hub 3 or easily removed therefrom. Tap bolts 13 serve to attach the ring 8 to annular flange 12 in the inner opening in the hub 3.

The ring 9, at the outer end of the spider, is shown with a cylindrical outstanding flange which is adapted to fit into the opening in the outer end of the hub 3. The inner circumference of this cylindrical flange of the ring 9, is threaded to receive a hub cap 14 which, when screwed in place, clamps the outer flanged end 6 of the hub 3 firmly between said hub cap 14 and the ring 9. By means of this construction, which is clearly shown in Fig. 4, the hub spider just described is rigidly secured to the hub 3 and acts as a part thereof.

On opposite sides of each of the connecting bars 10 are located pins 15 supported at their ends by the rings 8 and 9 and toward their centers by one or more lugs 11 attached to or integral with the connecting bars 10.

A series of swinging levers 16 are designed to conform approximately to the inner periphery of the resilient member 7 and are disposed in pairs around the inner circumference of said resilient member. It will be observed that there is one pair for each connecting bar 10 and that they extend in opposite directions therefrom. It will be seen also that the ends of the swinging levers 16, adjacent to the connecting bars 10, are provided with bearings which engage the pins 15, previously described, and consequently have a partial rotative movement about them in the plane of the wheel. In their positions of rest as shown in Fig. 3, these swinging levers 16 are normal to the radii of the wheel and therefore any pressure exerted against them from within, as by the connecting pieces 17, will be transmitted to the resilient member 7 in directions substantially radial with respect to the center of the wheel. Toward the outer or free end of the swinging levers 16, the pins 18 are mounted in lugs 19 integral with the said swinging levers.

An endless, inelastic, flexible band 20 is interposed between the inner circumference of the resilient member 7, and the spider connecting bars 10, and swinging levers 16, in the manner clearly shown in the several views. The functions of this band 20 will be fully described later.

On the axle 21 of the vehicle I mount a spider 22 which, in the design shown in the drawings, has a number of arms 23, at the extremities of which are the pin-carrying lugs 24 in which the pins 25 are mounted.

A number of connecting pieces 17, one for each swinging lever 16, are provided and are of suitable and substantial construction. The outer ends of these connecting pieces 17 engage pins 18 carried by the swinging levers 16 and the opposite ends of these swinging levers engage corresponding pins 25 carried by the axle spider 22. Any weight on the axle 21 is therefore transmitted through the spider 22, the connecting pieces 17, and swinging levers 16, to the resilient member 7 and, as has already been seen, no matter which swinging levers 16 are affected, the pressure on the resilient member 7 will be substantially radial with respect to the center of the wheel.

It will be observed that each alternate connecting piece 17 bears a certain angular relation both to the axle spider 22 and to its corresponding swinging lever 16 while the remaining alternate connecting pieces bear an opposite and, preferably, an equal angular relation to the axle spider 22 and to their corresponding swinging levers 16. This angular arrangement of the connecting pieces 17 is very important as it gives a comparatively even distribution of the weight to several of the swinging levers 16 simultaneously as they come successively into positions to receive the weight during the rotation of the wheel. Furthermore it permits driving the wheel in either direction without altering the construction of the wheel.

All pins 15, 18, and 25 are similar and preferably constructed as illustrated in Fig. 9 where they are shown hollow in order to contain a lubricant of suitable consistency. The ends of these hollow pins are closed by the plugs 26. Relatively small holes 27 communicate with the interior of the pins and permit the lubricant to work to the surface and prevent wear. These pins are all parallel to each other and to the axis of rotation of the wheel.

An important feature of my invention is the method I adopt to keep the outer wheel member, carrying the resilient member 7, in perfect alinement with the axle spider 22. By referring to Fig. 4, it will be seen that the axle spider 22, the connecting pieces 17, and the swinging levers 16, are all made as long as possible in the direction of the axis of the wheel and in this manner relatively long hinge joints are provided which can only operate parallel to each other and to the axis of rotation of the wheel. This construction, while permitting an absolutely free radial movement of the axle spider 22 within the hub 3, positively preserves true alinement between the outer wheel member and the inner or floating hub member in the plane of the wheel.

Referring to Figs. 3 and 4 it will be seen that the resilient member 7 is somewhat reduced in cross section at points corresponding to the location of the connecting bars 10. The most important object of this construction is to provide greater length of fabric in the inner circumference of the resilient member than if the inner circumference were a true circle. The circumference measured around the swinging levers 16 is increased as the weight on, and the torsion in, the axle 21 forces the said levers outwardly in the manner previously described. This action of the swinging levers 16 would be resisted by the unyielding fabric, of which the resilient member is composed, if provision were not made for the necessary extra length of same. In the method I have shown for meeting this contingency it is obvious that the swinging levers 16 can displace the inner circumference of the resilient member considerably before putting any circumferential strain in the fabric of which said resilient member is made.

The endless inelastic band 20 previously referred to, is intended to limit the movement of the swinging levers 16 beyond their normal working range as illustrated in Fig. 5, and thus prevent undue circumferential strain on the fabric of the resilient member 7. It will be clearly seen in Fig. 3 that this band 20 conforms to the inner circumference of the resilient member and, as explained in the case of the latter, the said band will be somewhat longer than if it were a true circle of the nominal inside diameter of the resilient member. It will therefore not offer any resistance to the radial action of the swinging levers 16 until they exceed their normal working movement.

Another function of this inelastic band 20 is shown in Fig. 6 where the resilient member has collapsed or has been removed. This inelastic limiting band 20 is here shown supported sucessively by the connecting bars 10 and receiving all the weight of the vehicle through the swinging levers 16. It will also be clearly seen in this view that the band 20 can be made of an elastic instead of an inelastic construction or material and thus perform, to a certain extent, the functions of the pneumatic resilient member 7. Another function of this band 20 is to take any slight surface wear due to the action of the swinging levers 16.

The operation of my invention will be clearly seen in Figs. 3, 5 and 7. In Fig. 3 all parts are shown, in their normal positions of rest with no weight on the axle spider 22. In Fig. 5 weight has been applied and the axle spider 22 is eccentric with respect to the outer hub 3. Assuming the weight to be downward the action of all of the swinging levers 16 can be readily seen in this view. It will be particularly noted that any pressure exerted by the several swinging levers 16 is substantially radial and will be independent of the direction in which weight is applied to the axle 21. This is an important point in my construction and is especially noticeable in Fig. 6 where two of the swinging levers 16, in positions considerably above the horizontal diametral line of the wheel, are seen to be assuming a small share of the load applied to the axle. In Fig. 5 the two swinging levers 16, located approximately on the horizontal diametral line, are transmitting a large portion of the vertical load to the resilient member 7 in substantially radial (in this particular instance, horizontal) directions with respect to the center of the wheel. This radial translation of the vertical movement positively prevents chafing of the resilient member at any point, especially the horizontal diametral points, during the revolution of the wheel.

Another important point in my invention is the translation of torsional strains, which are applied to the axle spider 22 when the wheel is being driven, into radial pressure on the resilient member 7. It will be seen in Fig. 5 that torsional strain applied to said hub spider 22 will tend to force each alternate swinging lever 16 outwardly, and draw the remaining ones inwardly. This action will take place, to a certain extent, independent of the vertical force due to the weight and an equalization of the two forces will occur automatically and can result only in radial pressure on the resilient member. It will also be seen that the pressure, due to the weight of the vehicle and to the torsional strain of driving, is applied to the resilient member 7 at a comparatively few points simultaneously through certain of the swinging levers 16 which, on account of the construction, receive substantially all of the weight. This distribution of pressure to the resilient member at several points instead of at one point—the road surface—as in the present pneumatic tire, permits the use of a much lower air pressure in the resilient member.

Although it is not necessary to make repairs to the resilient member when on the road on account of the function performed by the band 20 it may be necessary to replace or repair same at a convenient time. In order, therefore, to remove the resilient member it is first deflated after which the hub cap 14 is removed and then the tap bolts 13. The outer wheel which includes the hub 3, is then slipped from the hub spider carrying the resilient member 7 and band 20 with it.

I have herein described the preferred mechanical embodiment of my invention but one skilled in the art might make changes in detail and design which would accomplish the same result.

It will be observed that with the construction shown and described, the improved wheel comprises in general two main elements, the axle-engaging member and the tread or tire bearing member, each of these being bodily movable with respect to the other as a distinct unit. It will also be observed that these two units are connected together by a link and lever construction, the pivot pins of such connections being all disposed in parallel relation with the wheel axis, so that while the two units are maintained in fixed alinements in the plane of the wheel, they are freely movable with respect to each other within this plane. In order to resiliently hold the two units in concentric relation with each other, and to provide for the transmission of torque in the case of a driving wheel, the invention provides for maintaining an equal resilient force to uniformly oppose the movement of the lever and link connections out of normal position, thus tending to automatically center the two main members. The levers are arranged in pairs around the axle-engaging unit and are fulcrumed at their adjacent ends to fixed points on the tread unit, while the links diverge from radial direction and are pivotally connected with the swinging ends of the levers and with fixed points on the axle-engaging unit. This results in a tendency to radially expand or distort the circumference of the circle embracing the levers when relative rotary motion occurs between the two units, so that the resilient member in arresting said expansion makes possible the transmission of the torque from the axle-engaging member to the tread unit.

I therefore claim as new and desire to secure by Letters Patent:

1. A wheel comprising in combination an axle-engaging unit, a tread unit surrounding the same concentrically therewith, articulated expansible connections pivotally connecting the two units together and permitting freedom of relative motion between the two units in the plane of the wheel, and means for maintaining in all operative positions a substantially equal resilient force against all of said expansible connections to oppose departure of the two units from concentric relation and to enable the transmission of torque from one unit to the other.

2. A wheel comprising in combination an axle-engaging unit, a generally circular tread unit surrounding the same, a circular series of swinging levers pivoted to one of said units with their pivots and operating surfaces disposed in substantially circular alinement, links pivotally connecting the respective levers with the other unit to move said levers substantially radially out of their normal circular alinement when relative motion between said units occurs, and a pneumatic tube coöperating with said levers to maintain an equal resilient force against all of said levers.

3. A wheel comprising in combination an axle-engaging unit, a tread unit surrounding the same, one of said units having an annular chamber open around one periphery thereof, a pneumatic tube disposed therein, a system of levers pivoted to said chambered unit, and confining said pneumatic tube therein, and a system of links pivotally connecting said levers with the other unit, whereby relative motion between said units is opposed by said pneumatic tube.

4. In a resilient wheel the combination with an outer wheel member having an enlarged hub, of an annular resilient cushion mounted in said enlarged hub, an inner hub member to be mounted on the axle of the vehicle, swinging lever devices hinged to the interior of the hub of the outer wheel member in substantially circular alinement and operating against the inner periphery of the resilient cushion, and co-acting links hinged to the inner hub member and pivotally connected with the free ends of said levers.

5. A resilient wheel comprising an outer wheel member formed with an enlarged hub having an annular chamber open around its inner periphery, an annular resilient member mounted in the chamber of said enlarged hub, a spider removably secured in the enlarged hub of the outer wheel member, and a plurality of swinging levers pivoted transversely to said spider, said swinging levers having portions conforming substantially to the inner periphery of the resilient member.

6. In a resilient wheel the combination of an outer wheel member having an enlarged hub, a spider removably secured in the hub of said outer wheel member, a resilient member mounted in the annular space between said spider and the walls of the hub of the outer wheel member, and a plurality of oppositely disposed swinging levers pivoted to the spider, said levers having portions conforming substantially to the inner periphery of the resilient member and bearing against same in a substantially radial direction with respect to the center of the wheel.

7. In a wheel the combination of an outer wheel member having an annular chamber open throughout its entire inner periphery, resilient means mounted in said annular chamber, a frame removably mounted on said outer wheel member and provided with cross bars extending across the opening of said chamber to maintain said resilient means in fixed relation to the outer wheel member while leaving the major portion of its inner periphery exposed, and lever devices pivotally mounted on said cross bars and adapted to operate against the exposed inner periphery of said resilient means between said cross bars.

8. In a resilient wheel the combination with an outer wheel member adapted to receive a resilient member, of an annular resilient member carried by said outer wheel member, an inner hub spider arranged for a plurality of hinged connections parallel to its axis, a plurality of hinged swinging levers mounted in the hub of the outer wheel member around the inner periphery of said resilient member, the axes of said hinged swinging levers being parallel to the axis of the wheel, and a plurality of angularly arranged hinged pieces connecting the hub spider and the free ends of the said swinging levers.

9. A wheel comprising in combination an axle-engaging unit, a generally circular tread unit surrounding the same and concentric therewith, a circular series of levers pivoted to one of said units, links pivotally connecting said levers with the other of said units and an annular cushion encircling said levers in the unit to which they are pivoted, for restraining departure of the two units from concentric relation.

10. A wheel comprising in combination an axle-engaging unit, a tread unit surrounding the same and concentric therewith, a generally circular series of levers arranged in pairs with the adjacent ends of each pair fulcrumed at fixed points of one of said units, non-radial links pivotally connecting the other ends of said levers to eccentric fixed points of the other of said units to movably connect the two units together, and an annular cushion encircling said levers to restrain departure of the two units from concentric relation.

11. A wheel comprising in combination, an axle-engaging unit, a generally circular tread unit surrounding the same, a series of toggle operated levers jointed to one of said units, the toggles being pivotally connected with the other of said units, and an annular cushion encircling said levers and confined between the faces of said levers and the unit to which they are jointed.

12. In a resilient wheel an outer wheel member having an annularly enlarged hub, and an inner hub member, in combination with a pneumatic tube mounted in the enlarged hub of the outer wheel member and co-acting lever means fulcrumed to the outer wheel member substantially at the inner periphery of the pneumatic tube for the radial translation of combined load and torsional strains from the inner hub member to the said resilient member.

13. A wheel comprising in combination, inner and outer members, articulated connections permitting free relative movement between them, pneumatic resilient means mounted in one of said members for yieldingly opposing the motion of said articulated connections out of their normal positions, and means interposed between said connections and said pneumatic resilient means to prevent friction between them.

14. In a resilient wheel an outer wheel member having an enlarged hub, and an inner hub member mounted on the axle of the vehicle, in combination with a pneumatic resilient member mounted in the hub of the outer wheel member, radially acting lever devices having hinged connections to the inner hub member and to the hub of the outer wheel member said lever devices being adapted to compress the pneumatic resilient member substantially radially and an endless, inelastic, flexible band surrounding the lever devices and co-acting with the pneumatic resilient member to limit the radial movement of said lever devices toward said pneumatic resilient member beyond their normal working range.

15. In a resilient wheel an outer wheel member having an enlarged hub in which a pneumatic resilient member is mounted, and an inner hub member in combination with a plurality of co-acting lever devices fulcrumed to the outer wheel member substantially at the inner surface of said resilient member, means pivotally connecting said devices to the hub member and an inelastic flexible band surrounding said lever devices, said inelastic flexible band being adapted to permit limited radial movement of said lever devices against the pressure of said resilient member, but to sustain the weight normally carried by the pneumatic resilient member in the event of the latter becoming deflated.

16 In a resilient wheel an outer wheel member having an enlarged hub in which a pneumatic resilient member is located, in combination with a plurality of connecting bars mounted in the hub of the outer wheel member substantially at the inner surface of said resilient member and parallel to the wheel axis, an axle spider, a plurality of swinging levers hinged to said connecting bars on opposite sides thereof and conforming substantially to the inner periphery of the pneumatic resilient member, means connecting the levers to the said spider and an inelastic band surrounding the connecting bars and the swinging levers hinged thereon, said inelastic band being adapted to transfer the weight from the swinging levers to the connecting bars carried by the outer wheel member, in the event of the deflation of the pneumatic resilient member.

17. A wheel comprising in combination, an outer wheel member, an annular pneumatic tube concentrically mounted therein, and having indentations on its inner periphery to render intermediate portions of its inner periphery displaceable radially outward, a series of load-sustaining levers fulcrumed in said wheel member adjacent said indentations and operating against the radially displaceable intermediate portions of the said inner periphery of the pneumatic tube, and an axle-engaging member suitably connected with said levers to transfer the load thereto.

18. In a resilient wheel, the combination of an annular pneumatic resilient tube, having a plurality of indentations in its inner periphery and load-supporting means operating radially outward against the inner periphery thereof between said indentations.

19. In a resilient wheel of the character described, the combination of a pneumatic tube having a series of indentations on its inner periphery, cross bars disposed in said indentations, a flexible, inelastic, protecting band conforming with and held against the inner periphery of said tube by said cross bars, and load-sustaining levers fulcrumed to the cross bars and disposed to operate against the inner periphery of said band between the indentations.

20. In a resilient wheel, an outer wheel member having an enlarged hub provided with an annular chamber open around its inner periphery; in combination with an annular, resilient member mounted in the chamber of said enlarged hub; an axle-spider separably secured in the enlarged hub of the outer wheel member; a plurality of swinging levers conforming substantially to the inner periphery of the resilient member and coöperating with the latter; and connections between said levers and the axle-spider for transmitting pressure from the latter to the resilient member.

Signed at New York, in the county of New York and State of New York this 11th day of April, A. D. 1916.

MILTON T. WESTON.

Witnesses:
A. COWAN,
O. McKENZIE.